(12) United States Patent
Chir et al.

(10) Patent No.: US 11,065,690 B2
(45) Date of Patent: Jul. 20, 2021

(54) POWDER DEPOSITION APPARATUS AND A METHOD OF USING THE SAME

(71) Applicant: ROLLS-ROYCE plc, London (GB)

(72) Inventors: Adam P. Chir, Derby (GB); Richard Mellor, Solihull (GB)

(73) Assignee: ROLLS-ROYCE plc, London (GB)

( * ) Notice: Subject to any disclaimer, the term of this patent is extended or adjusted under 35 U.S.C. 154(b) by 253 days.

(21) Appl. No.: 16/413,025

(22) Filed: May 15, 2019

(65) Prior Publication Data
US 2019/0381567 A1    Dec. 19, 2019

(30) Foreign Application Priority Data

Jun. 13, 2018 (GB) ..................... 1809656

(51) Int. Cl.
*B22F 10/20* (2021.01)
*B33Y 10/00* (2015.01)
*B33Y 30/00* (2015.01)

(52) U.S. Cl.
CPC .......... *B22F 10/20* (2021.01); *B22F 2999/00* (2013.01); *B33Y 10/00* (2014.12); *B33Y 30/00* (2014.12)

(58) Field of Classification Search
CPC ...... B22F 10/20; B22F 2999/00; B33Y 10/00; B33Y 30/00
See application file for complete search history.

(56) References Cited

U.S. PATENT DOCUMENTS

| 5,876,550 A | 3/1999 | Feygin et al. |
| 2015/0321199 A1* | 11/2015 | Hales ..................... B01D 35/06 210/695 |
| 2016/0151840 A1* | 6/2016 | McCoy ................. B29C 64/153 425/78 |

FOREIGN PATENT DOCUMENTS

| CN | 104325140 A | 2/2015 | |
| JP | 2004-175093 A | 6/2004 | |
| JP | 2004175093 A * | 6/2004 | ............. B22F 3/105 |

OTHER PUBLICATIONS

Machine Translation of JP-2004175093-A (Year: 2004).*
Nov. 25, 2019 Search Report issued in European Patent Application No. 19177576.6.
Nov. 13, 2018 Search Report issued in Great Britain Application No. GB1809656.0.

* cited by examiner

*Primary Examiner* — Paul A Wartalowicz
*Assistant Examiner* — Ryan L Heckman
(74) *Attorney, Agent, or Firm* — Oliff PLC

(57) ABSTRACT

A powder deposition apparatus has a build plate, a powder source, a recoater arm, and an energy beam. The recoater arm is formed from ferromagnetic material.
The recoater arm is arranged to deliver a layer of powder from the powder source across the working surface of the build plate prior to the energy beam fusing a predetermined portion of the delivered powder layer. The recoater arm comprises a magnetic portion.

3 Claims, 2 Drawing Sheets

POWDER DEPOSITION APPARATUS AND A METHOD OF USING THE SAME

This disclosure claims the benefit of UK Patent Application No. GB 1809656.0, filed on 13 Jun. 2018, which is hereby incorporated herein in its entirety.

FIELD OF THE DISCLOSURE

The present disclosure relates to a powder deposition apparatus and particularly but not exclusively, to a powder deposition apparatus for an additive layer manufacturing process.

BACKGROUND TO THE DISCLOSURE

Additive Layer Manufacturing (ALM) refers to process used to create a three-dimensional object in which layers of material are formed under computer control to create an object. Powder bed is a subset of ALM processes whereby a layer of powder particles is deposited and rastered with a localised, controllable energy source to melt and fuse a proportion of the powder particles to form a region of continuous metal in the desired areas. The fused material corresponds to the two-dimensional profile of the three-dimensional final object at the layer height as determined by the process control system. The residual powder remains in a semi-compacted and/or sintered state. As successive layers of powder are fused a three-dimensional object is formed.

Many powder bed fusion processes use a solid recoater arm to deliver each fresh layer of powder prior to consolidation by electron beam, laser or other energy source. Typically, these recoater arms are formed from tool steels or other materials with a large iron content.

In normal operation the recoater blade may catch or rub against the previously consolidated layers. This may be a particular problem if the consolidated part on the build plate has any distortion resulting from the stresses generated in the ALM process, poor support structure, or if the part has swollen from the use of unbalanced or non-optimal melting parameters.

This abrasion between the recoater arm and the previously consolidated layers can cause wear or impact damage to the recoater arm itself. This in turn may result in the release of material from the recoater arm which may either become consolidated into the build in subsequent layers or may contaminate the unconsolidated powder which is expected to be sieved and reused for subsequent builds. The released material may also disrupt the distribution of powder in subsequent powder layers resulting in the present build failing. Conventional sieving is unlikely to remove such contamination creating the risk that multiple builds will contain elements of the recoater arm thus reducing material properties and part quality of the formed component.

STATEMENTS OF DISCLOSURE

According to a first aspect of the present disclosure there is provided a powder deposition apparatus comprising:
 a build plate;
 a powder source;
 a recoater arm formed from ferromagnetic material; and
 an energy beam,
wherein the recoater arm is configured to deliver a layer of powder from the powder source across a working surface of the build plate prior to the energy beam fusing a predetermined portion of the delivered powder layer, and the recoater arm comprises a magnetic portion, the magnetic portion comprises at least one first electromagnet, and the or each first electromagnet is configured to be activated on each n'th pass of the recoater arm across the working surface of the build plate, where n is an integer.

In the apparatus of the present disclosure, the recoater arm, or recoater assembly, is provided with a magnetic portion. In one arrangement, the magnetic portion is positioned in the part of the recoater arm, or recoater assembly, which contacts the working surface of the build plate.

The magnetic portion contains a sufficiently strong magnetic material to attract material at the powder surface and away from the layering edge.

The layering edge is a portion of the recoater arm that extends laterally across the build plate and which acts to spread the powder material across the build prior to it being, at least in part, fused by the energy beam. In an alternative arrangement, the recoater arm may be formed as a roller assembly.

This apparatus of the present disclosure reduces the likelihood of the additive layer build incorporating material that has been mechanically abraded from the recoater arm. This in turn reduces the occurrence of component failure due to the inclusion of such abraded material in the component and eliminates the risk of contamination of future additive layer builds in the apparatus. This has a positive effect on process yield, a reduction in powder costs, and improved customer confidence in the additive layer manufacturing process.

The electromagnet is activated throughout the sweep of the build chamber so that any material dislodged from the recoater is attracted to the recoater arm on either that pass or on subsequent passes. When the recoater arm reaches the powder recovery position the electromagnet is deactivated and the magnetically attached debris falls in to the powder recovery chute.

In one arrangement of the disclosure, the first electromagnet is not activated for every pass of the recoater arm over the working surface of the build plate but for every, say, second or third pass over the working surface. This makes the apparatus more efficient by reducing the energy consumption, and by reducing the time lost to the debris recovery phase of the production operation.

Optionally, the magnetic portion of the recoater arm ends along axial length of the recoater arm.

In one arrangement of the disclosure the magnetic portion extends along an entire length of the recoater arm. In an alternative arrangement, the magnetic portion extends only over a portion, or portions, of the length of the recoater arm that corresponds to the profile of the working surface of the build plate.

Optionally, the or each first electromagnet is configured to be deactivated at the end of each delivery pass of the recoater arm across the working surface of the build plate.

The recoater arm makes a delivery pass across the build plate in which it spreads a layer of the powder material across the working surface. At this point the recoater arm makes a return pass back across the working surface in readiness for the powder bed to index upward and prepare the next quantity of powder material for distribution across the working surface. In other arrangements the powder distribution may happen when the recoater arm moves in each of the two opposite directions.

When making the return pass across the working surface there is no requirement for the or each first electromagnet to be activated. Not activating the or each first electromagnet on the return pass reduces the energy consumption of the apparatus.

Optionally, at the end of each delivery pass the recoater arm is configured to deliver any powder material not deposited across the working surface of the build plate into a powder recovery chute.

In one arrangement, at the end of the delivery pass the recoater arm moves past the end of the working surface and over a powder recovery chute. The powder recovery chute is adjacent the working surface and any powder material in excess of that required to create the next layer on the working surface is swept into the powder recovery chute in readiness for recycling back into the powder bed. In a dual-direction recoating arrangement (i.e. one in which powder is deposited with the recoater arm moving in either direction) then there may be two powder recovery chutes.

Once over the powder recovery chute the or each first electromagnet can be deactivated thus causing any ferromagnetic particles that have been attracted to the electromagnet to drop into the powder recovery chute. These ferromagnetic particles must subsequently be removed from the unused powder material before the recycling.

Optionally, the powder recovery chute comprises at least one second electromagnet.

The use of a second electromagnet in the powder recovery chute will result in effective removal of this debris from the unused powder material before this is recycled into the powder bed. This eliminates the need to filter the ferromagnetic particles out of the unused powder material and so rakes the apparatus more efficient and useful for a user.

According to a second aspect of the present disclosure there is provided a method of forming an additive layer manufactured component using a powder deposition apparatus, the powder deposition apparatus comprising a build plate, a powder source, a recoater arm formed from ferromagnetic material, a magnetic portion of the recoater arm comprising at least one first electromagnet, and an energy beam, the method comprising the steps of:
 (i) positioning the build plate;
 (ii) depositing a layer of powder material from the powder source across a working surface of the build plate using the recoater arm;
 (iii)a actuating the at least one first electromagnet portion of the recoater arm; and
 (iii)b collecting any loose ferromagnetic particles from the working surface using an electromagnetic portion of the recoater arm.

In the apparatus of the present disclosure, the recoater arm, or recoater assembly, is provided with a magnetic portion. In one arrangement, the magnetic portion is positioned in the part of the recoater arm, or recoater assembly, which contacts the working surface of the build plate.

The magnetic portion contains a sufficiently strong magnetic material to attract material at the powder surface and away from the layering edge.

This apparatus of the present disclosure reduces the likelihood of the additive layer build to incorporating material that has been mechanically abraded from the recoater arm. This in turn reduces the occurrence of component failure due to the inclusion of such abraded material in the component and eliminates the risk of contamination of future additive layer builds in the apparatus. This has a positive effect on process yield, a reduction in powder costs, and improved customer confidence in the additive layer manufacturing process.

The electromagnet is activated throughout the sweep of the build chamber so that any material dislodged from the recoater is attracted to the recoater arm on either that pass or on subsequent passes. When the recoater arm reaches the powder recovery position the electromagnet is deactivated and the magnetically attached debris falls in to the powder recovery chute.

Optionally the method comprises the additional steps of:
 (iv) aligning the recoater arm with a powder recovery chute being spaced apart from the working surface; and
 (v) deactivating the electromagnetic portion of the recoater area to allow the collected ferromagnetic particles to fall into the powder recovery chute.

The recoater arm makes a delivery pass across the build plate in which it spreads a layer of the powder material across the working surface. At this point, the recoater arm makes a return pass back across the working surface in readiness for the powder bed to index upward and prepare the next quantity of powder material for distribution across the working surface.

When making the return pass across the working surface there is no requirement for the or each first electromagnet to be activated. Not activating the or each first electromagnet on the return pass reduces the energy consumption of the apparatus.

In one arrangement, at the end of the delivery pass the recoater arm moves past the end of the working surface and over a powder recovery chute. The powder recovery chute is adjacent the working surface and any powder material in excess of that required to create the next layer on the working surface is swept into the powder recovery chute in readiness for recycling back into the powder bed.

Once over the powder recovery chute the or each first electromagnet can be deactivated thus causing any ferromagnetic particles that have been attracted to the electromagnet to drop into the powder recovery chute. These ferromagnetic particles must subsequently be removed from the unused powder material before the recycling.

According to a third aspect of the present disclosure there is provided a computer program that, when read by a computer, causes performance of the method according to the second aspect.

According to a fourth aspect of the present disclosure there is provided a non-transitory computer readable storage medium comprising computer readable instructions that, when read by a computer causes performance of the method according to the second aspect.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Other aspects of the disclosure provide devices, methods and systems which include and/or implement some or all of the actions described herein.

BRIEF DESCRIPTION OF THE DRAWINGS

There now follows a description of an embodiment of the disclosure, by way of non-limiting example, with reference being made to the accompanying drawings in which.

It is noted that the drawings may not be to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
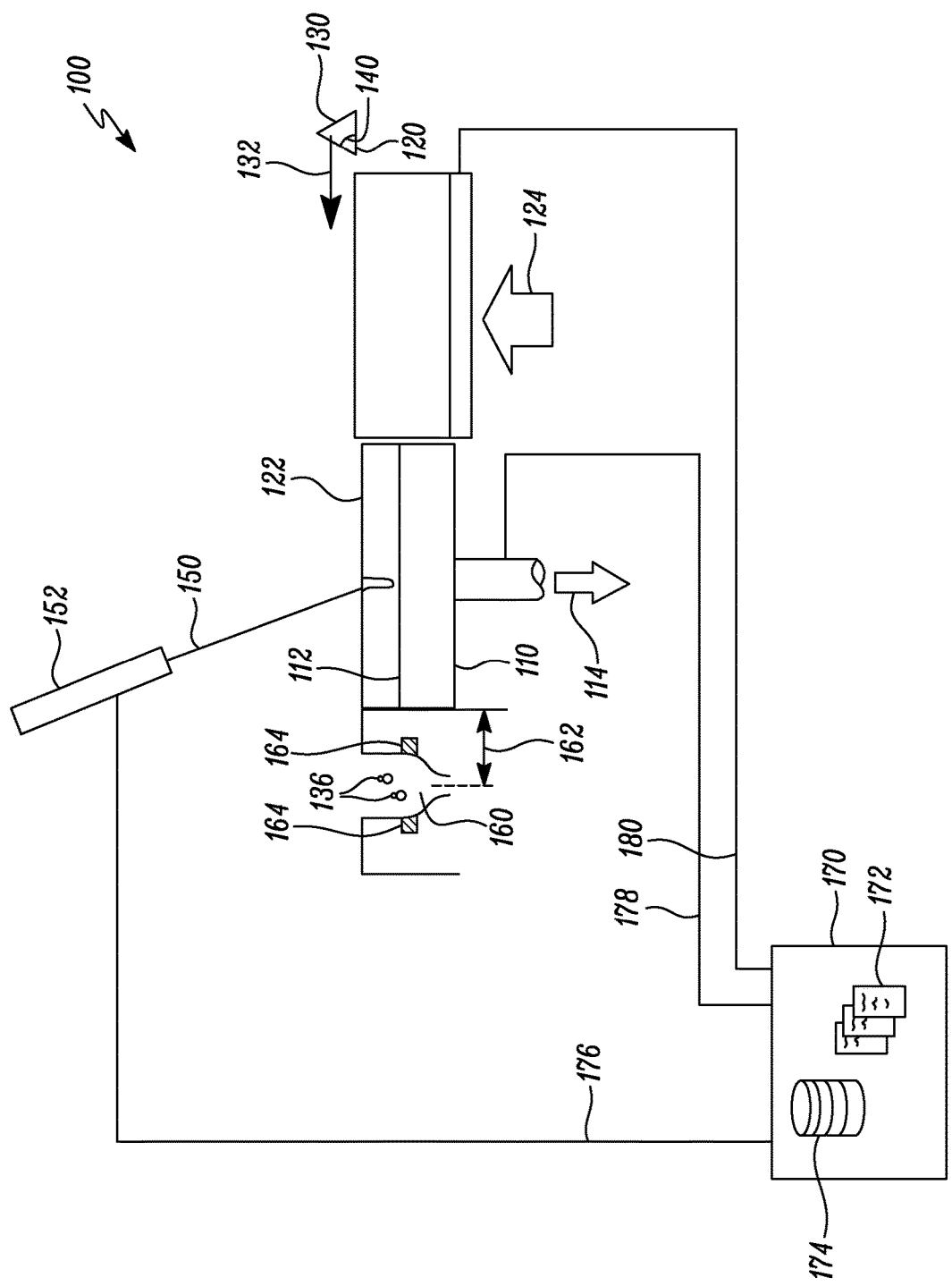
FIG. 1 shows a schematic sectional view of a powder deposition apparatus according to an embodiment of the disclosure.
Figure 2:
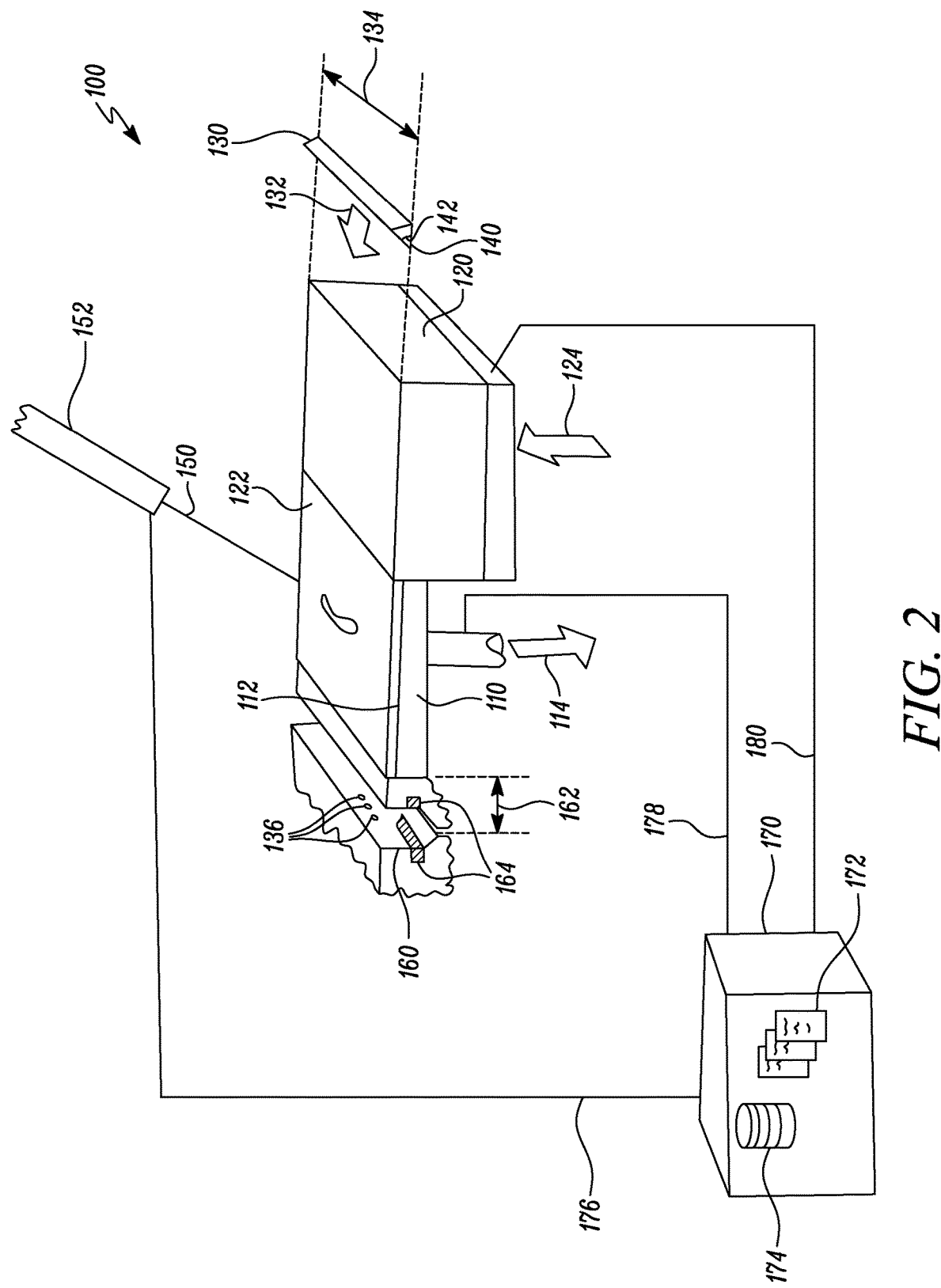
FIG. 2 shows a schematic perspective view of the apparatus of FIG. 1.

Referring to FIGS. 1 and 2, a powder deposition apparatus according to a first embodiment of the disclosure is designated generally by the reference numeral 100.

The powder deposition apparatus 100 has a build plate 110, a powder source 120, a recoater arm 130, and an energy beam 150.

The build plate 110, a powder source 120, and energy beam 150 all function in exactly the same manner as for a conventional powder deposition ALM machine. These features will not be described in detail since such detail is well known to a skilled person.

The build plate 110 accommodates the layers of powder material 122 that are distributed from the powder source 120 using the recoater arm 130. The energy beam 150 may be a laser beam, an electron beam, or any other suitable energy beam source, produced by an energy beam device 152.

The recoater arm 130 performs the function of spreading a layer of powder material 122 onto a working surface 112 of the build plate 110, from the powder source 120. The recoater arm 130 traverses the powder source 120 in a traverse direction 132 to collect the powder that will form the powder layer 122. The recoater arm 130 is formed from a steel alloy material.

Once a powder material layer 122 is formed across the working surface 112 of the build plate, the energy beam 150 is actuated to selectively fuse a portion of the powder material layer 122 that corresponds to a two-dimensional form of the component being generated.

In the powder deposition apparatus 100 of the present disclosure, the recoater arm 130 is provided with a magnetic portion 140. This magnetic portion 140 takes the form of a first electromagnet 142 that extends along an axial length 134 of the recoater arm 130. The first electromagnet 142 is positioned at a leading edge of the recoater arm 130; the leading edge being defined with respect to the direction of travel of the recoater arm 130.

The build plate 110 is indexed in a downward direction 114 to provide a space to accommodate the layer of powder material 122. The recoater arm 130 then continues to traverse the working surface 112 of the build plate 110 to form the powder material layer 122.

Once the recoater arm 130 has traversed the working surface 112 it continues to traverse past the build plate 110 and over a powder recovery chute 160 positioned adjacent to the build plate 110. The powder recovery chute 160 is spaced from the build plate by a spacing distance 162. In the present arrangement, a second electromagnet 164 is positioned in the powder recovery chute 162.

As powder material is removed from the powder source 120, the powder source is raised upward 124 in readiness for the next powder layer 122 to be distributed.

In the present arrangement, the first electromagnet 142 is actuated on every delivery pass of the recoater arm 130 over the working surface 112 of the build plate 110. When actuated, the first electromagnet 142 will collect any ferromagnetic debris particles 136 that may have been abraded from the recoater arm 130 by mechanical contact with any part of the fused portion of the powder material layer 122.

Any ferromagnetic debris particles 136 will be carried by the recoater arm 130 as it traverses the working surface 112. Once the recoater arm has reached the end of the working surface 122, the recoater arm passes over the powder recovery chute 160. Any excess powder material over that required to form the powder layer 122 will at this point be directed into the powder recovery chute 160. At this point, the first electromagnet 142 can be deactivated to allow the ferromagnetic debris particles 136 to fall into the powder recovery chute 160.

The second electromagnet 162 can be actuated while the powder deposition apparatus 100 is in operation. Consequently, the ferromagnetic debris particles 136 are selectively trapped as they fall into the powder recovery chute 160. This enables the ferromagnetic debris particles 136 to be kept separate from the excess powder material that is to be recycled into the powder bed.

Movement of the build plate 110 together with movement of the powder source 124 and movement of the energy beam device 152 is controlled by a computer program 172 that is arranged to operate on a computer 170. The computer program 172 may be stored on a computer readable storage medium 174. Operation of the computer program 172 on the computer 170 results in the generation of a signal 176 that is directed to the energy beam device 152, the generation of a signal 178 that is directed to the build plate 110, and the generation of a signal 180 that is directed to the powder source 124, in order to produce the movement of the ultrasonic probe 140.

In one or more examples, the operations described may be implemented in hardware, software, firmware, or any combination thereof. If implemented in software, the operations may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray™ disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a processor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

Various example embodiments of the invention are described herein. Reference is made to these examples in a non-limiting sense. They are provided to illustrate more broadly applicable aspects of the invention. Further, it will be appreciated by those with skill in the art that each of the individual variations described and illustrated herein has discrete components and features which may be readily separated from or combined with the features of any of the other several embodiments without departing from the scope of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

In addition, where a range of values is provided, it is understood that every intervening value, between the upper and lower limit of that range and any other stated or intervening value in that stated range, is encompassed within the invention.

Except where mutually exclusive, any of the features may be employed separately or in combination with any other features and the disclosure extends to and includes all combinations and sub-combinations of one or more features described herein.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to a person of skill in the art are included within the scope of the disclosure as defined by the accompanying claims.

What is claimed is:

1. A powder deposition apparatus comprising:
   a build plate;
   a powder source;
   a recoater arm formed from ferromagnetic material; and
   an energy beam,
   wherein the recoater arm is configured to deliver a layer of powder from the powder source across a working surface of the build plate prior to the energy beam fusing a predetermined portion of the delivered powder layer, and the recoater arm comprises a magnetic portion, the magnetic portion comprises at least one first electromagnet, and the or each first electromagnet is configured to be activated on each n'th pass of the recoater arm across the working surface of the build plate, where n is an integer, the first electromagnet disposed on the recoater arm in such a manner so as to collect particles abraded from the recoater arm, and
   wherein the magnetic portion is positioned in a part of the recoater arm that contacts the working surface of the build plate, and
   wherein at the end of each delivery pass the recoater arm is configured to deliver any powder material not deposited across the working surface of the build plate into a powder recovery chute, and
   wherein the powder recovery chute comprises at least one second electromagnet, and
   wherein the at least one first electromagnet extends along an axial length of the recoater arm and is positioned at a leading edge of the recoater arm.

2. The powder deposition apparatus as claimed in claim 1, wherein the magnetic portion of the recoater arm extends along an axial length of the recoater arm.

3. The powder deposition apparatus as claimed in claim 1, wherein the or each first electromagnet is configured to be deactivated at the end of each delivery pass of the recoater arm across the working surface of the build plate.

* * * * *